(12) United States Patent
Frenger et al.

(10) Patent No.: US 10,405,201 B2
(45) Date of Patent: Sep. 3, 2019

(54) RE-CONFIGURATION OF RBS PERFORMANCE MODE

(71) Applicant: TELEFONAKTIEBOLAGET LM ERICSSON (publ), Stockholm (SE)

(72) Inventors: Pål Frenger, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 130 days.

(21) Appl. No.: 15/309,488

(22) PCT Filed: May 8, 2014

(86) PCT No.: PCT/EP2014/059461
§ 371 (c)(1),
(2) Date: Nov. 8, 2016

(87) PCT Pub. No.: WO2015/169375
PCT Pub. Date: Nov. 12, 2015

(65) Prior Publication Data
US 2017/0156068 A1 Jun. 1, 2017

(51) Int. Cl.
*H04W 24/02* (2009.01)
*H04B 17/345* (2015.01)
(Continued)

(52) U.S. Cl.
CPC .......... *H04W 24/02* (2013.01); *H04B 17/345* (2015.01); *H04L 43/0888* (2013.01);
(Continued)

(58) Field of Classification Search
CPC ..... H04W 24/00; H04W 24/02; H04W 48/08; H04W 52/0206; H04W 8/22;
(Continued)

(56) References Cited

U.S. PATENT DOCUMENTS

| 8,588,089 | B2 | 11/2013 | Döttling et al. |
| 9,203,397 | B1* | 12/2015 | Ebeling ................. H03K 17/22 |
| 2002/0122429 | A1* | 9/2002 | Griggs .............. H04L 29/06027 370/401 |
| 2006/0171346 | A1* | 8/2006 | Kolavennu ........... H04L 45/028 370/328 |
| 2011/0081897 | A1 | 4/2011 | Beattie, Jr. et al. |

(Continued)

FOREIGN PATENT DOCUMENTS

WO 2013066220 A1 5/2013

OTHER PUBLICATIONS

Written Opinion and International Search Report issued for PCT/EP2014/059461 dated Feb. 10, 2015, 9 pages.

*Primary Examiner* — Rownak Islam
(74) *Attorney, Agent, or Firm* — Rothwell, Figg, Ernst & Manbeck, p.c.

(57) ABSTRACT

A method in a network node for triggering a re-configuration of a radio base station, RBS. The RBS supports a configured performance mode and an increased performance mode. The method comprises the steps of estimating (S2) a future demand for resource usage in the RBS by at least one wireless device, and determining (S3) a re-configuration gain as a difference between a performance metric of the RBS for meeting the estimated future demand for resource usage in the increased performance mode and in the configured mode, as well as triggering (S5) a performance mode re-configuration of the RBS into the increased performance mode based on if the re-configuration gain exceeds a predetermined threshold.

18 Claims, 6 Drawing Sheets

(51) Int. Cl.
*H04L 12/26* (2006.01)
*H04W 8/22* (2009.01)
*H04W 48/08* (2009.01)
*H04W 52/02* (2009.01)

(52) U.S. Cl.
CPC ............... *H04L 43/16* (2013.01); *H04W 8/22* (2013.01); *H04W 48/08* (2013.01); *H04W 52/0206* (2013.01); *Y02D 70/122* (2018.01); *Y02D 70/1262* (2018.01); *Y02D 70/142* (2018.01)

(58) Field of Classification Search
CPC . H04B 17/309; H04B 17/345; H04L 43/0888; H04L 43/16; Y02D 70/00; Y02D 70/1262; Y02D 70/142; Y02D 70/122
USPC .......................................................... 370/254
See application file for complete search history.

(56) References Cited

U.S. PATENT DOCUMENTS

| | | | |
|---|---|---|---|
| 2011/0096687 A1* | 4/2011 | Dottling | H04W 24/02 370/252 |
| 2013/0244679 A1* | 9/2013 | Anbe | H04W 76/10 455/452.1 |
| 2014/0226484 A1* | 8/2014 | Koskela | H04W 72/1284 370/235 |
| 2014/0376401 A1* | 12/2014 | Kanamarlapudi | H04B 7/26 370/253 |
| 2015/0271806 A1* | 9/2015 | Kim | H04L 5/0007 455/452.1 |
| 2016/0135087 A1* | 5/2016 | Xu | H04W 28/08 455/436 |

* cited by examiner

RE-CONFIGURATION OF RBS PERFORMANCE MODE

CROSS REFERENCE TO RELATED APPLICATION(S)

This application is a 35 U.S.C. § 371 National Phase Entry Application from PCT/EP2014/059461, filed May 8, 2014, designating the United States, the disclosure of which is incorporated by reference.

TECHNICAL FIELD

The present disclosure relates to wireless communication networks, and in particular to performance level re-configuration of a radio base station.

BACKGROUND

A cellular communication network is a wireless communication network where one or more wireless devices communicate with one or more radio base stations, RBSs, possibly organized in one or more cells.

Examples of such cellular communication networks include wireless networks implementing global system for mobile communications, GSM, wideband code division multiple access, WCDMA, or long term evolution, LTE, radio access technologies, RATs, or any other RAT defined by, e.g., the 3rd generation partnership project, 3GPP.

Other examples of cellular communication networks include networks implementing the RATs of the third, fourth and fifth generation communication systems, 3G, 4G, 5G, and also wireless local area networks, WLANs.

The wireless signals transmitted by the one or more RBSs may interfere with each other. This interference is herein referred to as inter-cell interference. A large amount of inter-cell interference is undesirable since inter-cell interference generally degrades network performance.

RBSs in general consume significant amounts of power during operation, which power consumption drives the cost of operating a network. Thus, in order to lower operating costs in cellular communication networks, it is often desired to reduce RBS energy consumption.

An RBS which serves no traffic can in some circumstances enter into a dormant mode and thereby reduce both network energy consumption and inter-cell interference. This technique of entering dormant mode is especially interesting for small capacity RBSs which are covered by an umbrella or macro RBS in a heterogeneous network scenario.

When an RBS or cell goes into dormant mode it becomes invisible for the wireless devices in the communication network. Hence it is a quite drastic action to take. Instead of entering dormant mode, an active RBS can take several, less drastic, actions in order to reduce energy consumption and/or inter-cell interference.

For instance, as an alternative to entering dormant mode, an RBS serving a multi-sector cell can reduce the number of active antennas, going from a multi-sector configuration into a single sector configuration which only uses a single omni-directional antenna.

An RBS can also, instead of entering dormant mode, reduce its signaling bandwidth used for communication with wireless devices and other RBSs, e.g., by replacing an active wide-band cell with a narrow-band cell.

Thus, RBSs can switch between two or more performance modes, i.e., operating modes in which the RBS provides different performance levels. However, during switching between such different performance level configurations, the performance of an RBS may be temporarily degraded.

As an example of this temporary performance level degradation, consider a re-configuration from a single sector antenna mode into a multi-sector mode of operation in an RBS. In this case a handover of served wireless devices between the single-sector set-up RBS and the new multi-sector set-up RBS may be necessary. This handover drives signaling overhead and also increases the risk of radio link failure. In case the single-sector cell and the multi-sector cells are active simultaneously during the transition between different levels of performance, the interference level in the network is increased, which can temporarily degrade user throughput in the network.

Thus, the performance of an RBS which is switching from a presently configured reduced performance mode into an increased performance mode can actually first decrease below the reduced performance level before increasing up to the new, higher, performance level. A temporary reduction in RBS performance due to performance level re-configuration will herein be referred to as a re-configuration penalty.

Because of this re-configuration penalty, a wireless device entering a cell having a reduced performance level, and wherein the wireless device requires a higher service level than presently offered in the cell, may initially experience worsened conditions as the RBS performance level is re-configured from the reduced level into a higher performance level.

SUMMARY

An object of the present disclosure is to provide methods and network nodes which seek to mitigate, alleviate, or eliminate one or more of the above-identified deficiencies in the art and disadvantages singly or in any combination and to provide improved mechanisms for performance level re-configuration of a radio base station, RBS.

This object is obtained by a method in a network node for triggering a re-configuration of an RBS, wherein the RBS supports a configured performance mode and an increased performance mode. The method comprises the steps of estimating a future demand for resource usage in the RBS by at least one wireless device. The method also comprises the step of determining a re-configuration gain as a difference between a performance metric of the RBS for meeting the estimated future demand for resource usage in the increased performance mode and in the configured mode. The method further comprises the step of triggering a performance mode re-configuration of the RBS into the increased performance mode based on if the re-configuration gain exceeds a pre-determined threshold.

Thus, by the disclosed method, a performance mode re-configuration of the RBS is only triggered in cases where a sufficiently high re-configuration gain can be expected to result from the re-configuration, i.e., a re-configuration gain above the pre-determined threshold.

Consequently, RBS re-configuration is only triggered in cases where the re-configuration is expected to actually result in a service level improvement, with respect to said performance metric, for the at least one wireless device, given the estimated future demand for resource usage.

Performance mode re-configuration is not triggered in cases where the re-configuration is expected to result in a negative re-configuration gain, i.e., a re-configuration loss, or an insignificant re-configuration gain below the pre-determined threshold. Thus, in cases where the estimated future demand for resource usage is so small as to make a re-configuration wasteful in terms of said performance metric, the RBS re-configuration is deferred or not triggered at all.

One effect of the present teaching is a reduction in the total number of wasteful RBS re-configurations that are triggered, since at least some RBS re-configurations which would not have led to increased performance, as seen from the point of view of the at least one wireless device, are deferred. This will reduce energy consumption and/or inter-cell interference in the cellular communication network of the RBS.

Another effect of the present teaching is an enablement of a more aggressive use of RBS performance level re-configuration in networks in general. Since, by the present method, performance mode re-configurations resulting in significant re-configuration loss are avoided, the potential drawbacks of performance mode re-configuration are alleviated.

Furthermore, said pre-determined threshold represents a mechanism for tuning when re-configuration is triggered. Thus, the re-configuration frequency in a network can be controlled by, e.g. a network operator, in a straight forward way by setting the pre-determined threshold. This allows for a further optimization of RBS operation in terms of energy consumption and/or inter-cell interference.

According to some aspects, the network node is a central network control entity of a radio network comprising the RBS and the at least one wireless device, in which case the step of triggering comprises transmitting a re-configuration instruction message to the RBS.

According to some other aspects, the network node is comprised in the RBS, in which case the step of triggering comprises initiating a re-configuration of the RBS into the increased performance mode.

Thus, the methods disclosed herein are not constrained to be implemented in, or executed by, a particular network entity, but can be implemented in several optional locations throughout a cellular communication network, either centrally in, e.g., a network control entity or more locally in the RBSs of the network.

Furthermore, since wireless devices in the cellular communication network do not need to actively partake in the above method, the present teaching can be applied in a cellular communication network comprising legacy wireless devices, i.e., comprising wireless devices which have not been updated, or otherwise configured, to support the present technique.

There is also provided a computer program, comprising computer readable code which, when run in a network node, causes the network node to perform any aspects of the methods disclosed herein.

The object is also obtained by a network node adapted to trigger a re-configuration of an RBS supporting a configured performance mode and an increased performance mode. The network node comprises a communication interface configured for communicating with further network nodes in a radio network comprising the RBS and at least one wireless device. The network node also comprises a processor unit, and a memory unit. The processor unit is adapted to estimate a future demand for resource usage in the RBS by the at least one wireless device. The processor unit is also adapted to determine a re-configuration gain as a difference between a performance metric of the RBS for meeting the estimated future demand in the increased performance mode and in the configured mode. The processor unit is further adapted to trigger a performance mode re-configuration of the RBS into the increased performance mode based on if the re-configuration gain exceeds a pre-determined threshold.

The computer program and the network node display advantages corresponding to the advantages already described in relation to the methods above.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The network nodes, computer programs and methods disclosed herein can, however, be realized in many different forms and should not be construed as being limited to the aspects set forth herein. Like numbers in the drawings refer to like elements throughout, except for a prefix digit in the number which represents the figure in which the element is to be found.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

As mentioned above, during switching between different performance modes of a radio base station, RBS, the performance level of the RBS is often temporarily degraded during an initial activation delay, an effect which is referred to herein as a re-configuration penalty.

Figure 1:
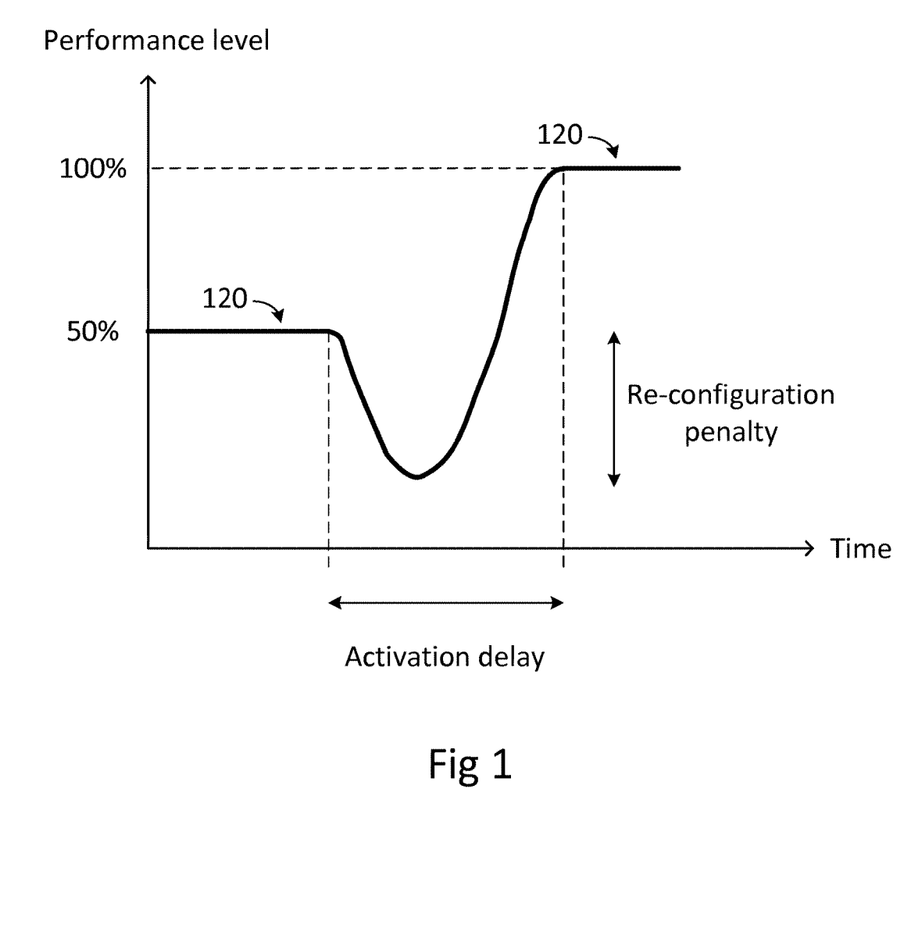
FIG. 1 is a graph of performance level as function of time.

FIG. 1 shows a graph of performance level 120 as function of time when an RBS is being re-configured from a configured, or reduced, performance mode of operation, here shown as '50%', into an increased performance mode of operation, here shown as '100%'. An activation delay is associated with the re-configuration, as well as a re-configuration penalty in performance level.

Changing the performance level or performance mode of an RBS can be achieved in many different ways. Examples of such procedures are described below in connection to FIG. 3.

A wireless device entering a cell served by an RBS having a configured performance mode corresponding to a performance level below some increased performance level, and requiring a higher service level than that which is presently configured in the RBS, will as a consequence of the re-configuration penalty first experience worsened service during a time window while the RBS activates the increased performance level configuration, before starting to experience an improvement in performance level corresponding to the increased performance level configuration.

Figure 4:
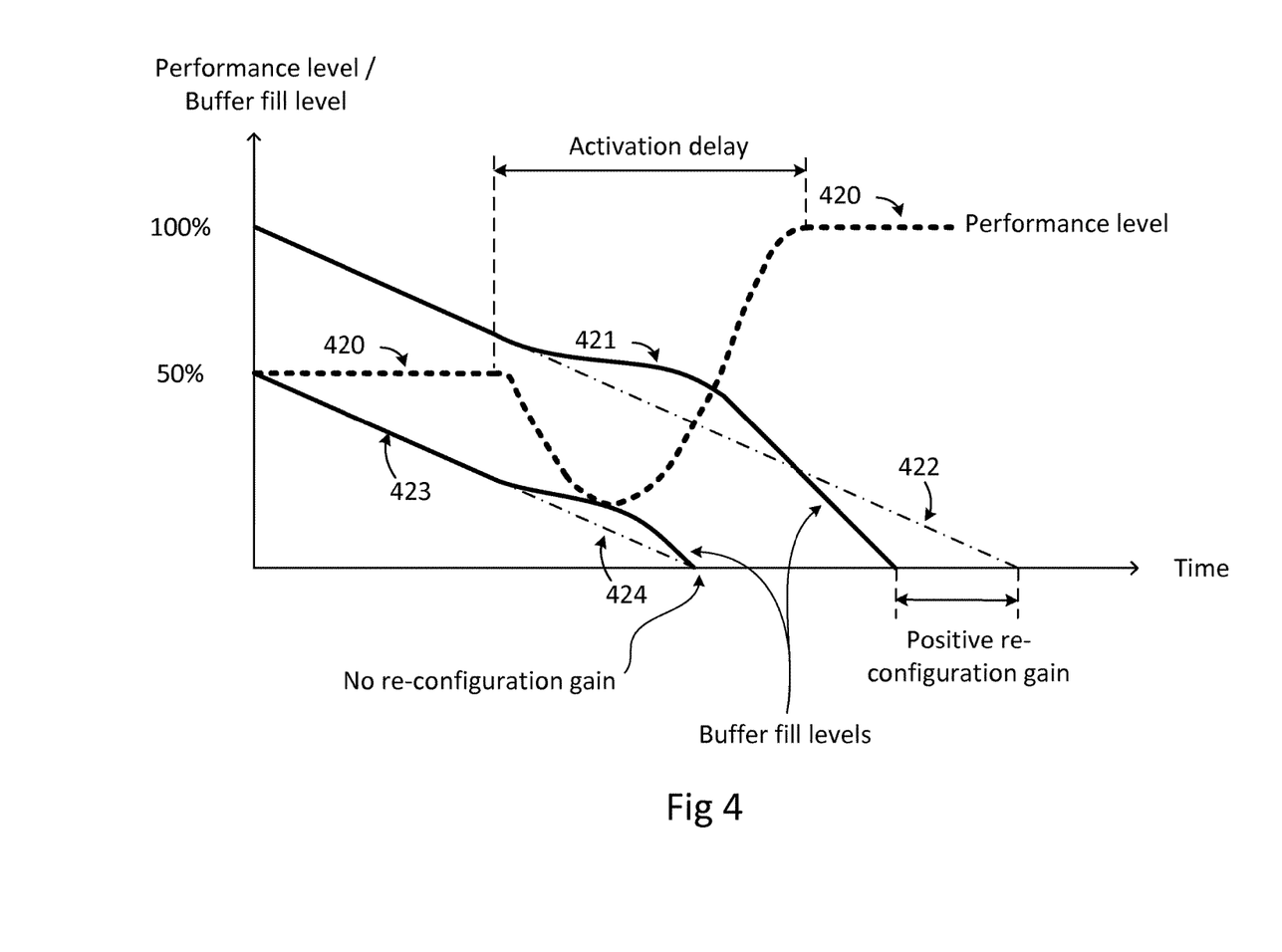
FIG. 4 is a graph of performance level and buffer fill level as function of time.

Consequently, it does not always make sense to trigger a re-configuration for servicing a wireless device at an increased performance level. On the contrary, sometimes it is better to defer triggering of performance mode re-configuration. An example of when performance level re-configuration would be wasteful, which is further discussed below in connection to FIG. 4, is the case when a wireless device only has very little data left in its transmit buffer to transmit, such that the transmit buffer will be depleted long before the expiration of the activation delay.

As will be made clear from the below description, it is possible to beforehand determine, based on an estimated future demand for resource usage in the RBS, if a re-configuration will result in a re-configuration gain, or if there is no reason to trigger a re-configuration since it cannot be expected to result in any significant re-configuration gain. In this way RBS re-configuration is only triggered when the re-configuration is expected to actually result in an improvement of some given performance metric of the network or RBS.

Herein, the term 'performance' can refer to, for instance, any combination of capacity in terms of traffic throughput, processing delay, transmission delay, data buffering capability, or transmission error rate performance. An RBS configured for operation at a given performance level is said to operate in a certain performance mode, in which mode of operation the performance of the RBS corresponds to the given performance level.

Thus, an RBS can be operating in a configured mode, meaning the performance mode in which the RBS is currently operating, or the RBS can be operating in an increased performance mode, i.e., in another performance mode different from the configured mode, in which mode the RBS has an increased performance level compared to the performance level of the configured mode.

Figure 2:
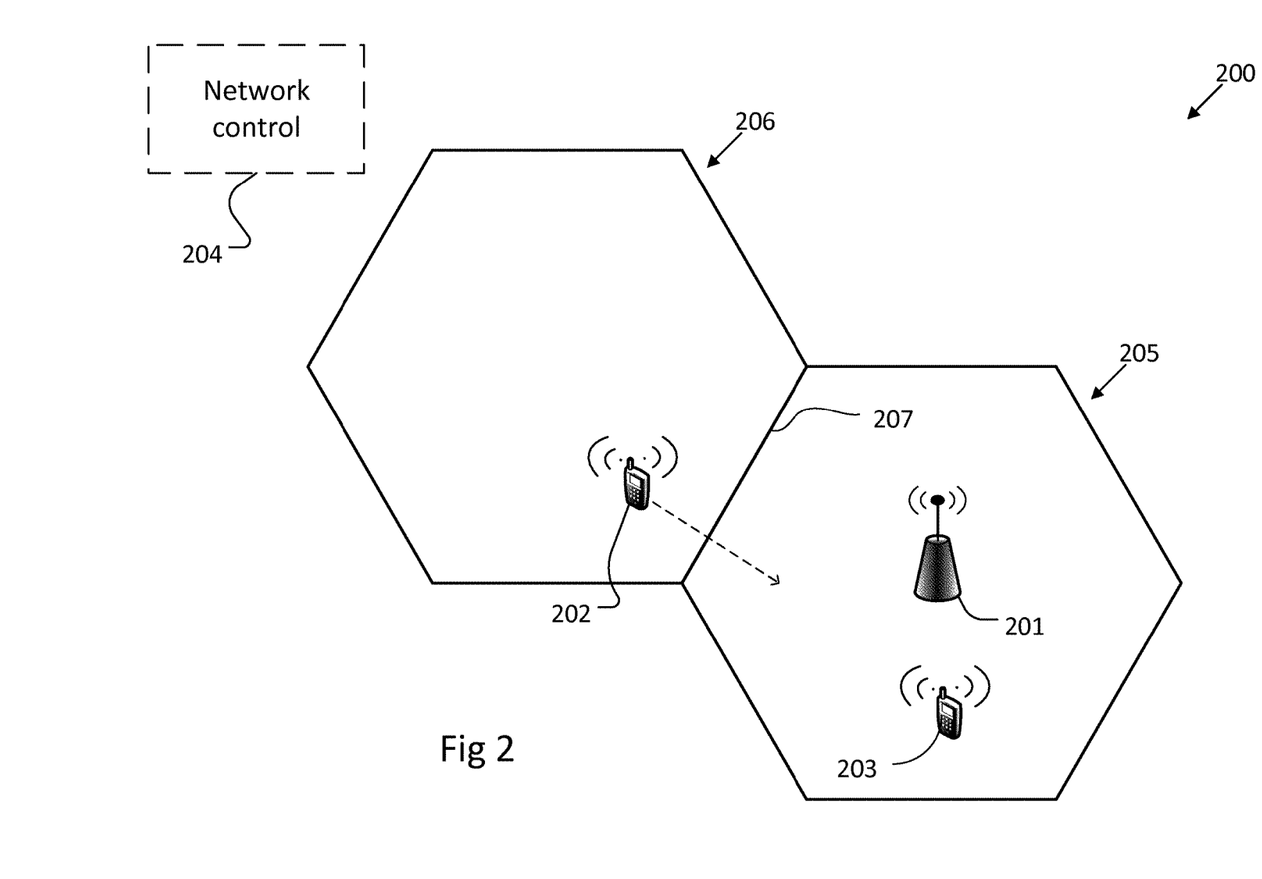
FIG. 2 is a schematic illustration of a radio network.

In order to put the present teaching into context, FIG. 2 shows a schematic illustration of a radio network 200 where the present technique is implemented in order to improve on the mechanism for performance level re-configuration of RBSs and thus reduce the effects of the re-configuration penalty on wireless devices 202, 203.

The radio network 200 is here shown to comprise a network control entity 204, which network control entity 204 is optional and only used in some aspects of the present teaching.

The radio network 200 comprises an RBS 201 serving a cell 205. There is also shown one further cell 206, which further cell 206 is served by a further RBS not shown in FIG. 2.

A first wireless device 202 is located in the further cell 206. However, the first wireless device 202 is approaching the cell border 207 between the further cell 206 and the cell 205 of the RBS 201. Thus, since the first wireless device 202 approaches the RBS 201, a handover of the first wireless device 202 from the further cell 206 to the cell 205 of the RBS 201 is likely to occur.

The direction of movement of the wireless device 202 is shown in FIG. 2 by a dashed line.

Now, suppose the RBS 201 is operating in a configured performance mode, at a performance level below some increased performance level, while the approaching first wireless device 202 requires service at the increased performance level. In this case it is potentially advantageous to re-configure the RBS 201 into the increased performance mode in order to properly service the approaching first wireless device 202 following handover of the first wireless device 202 to the RBS 201. However, in case, e.g., the approaching first wireless device 202 only has very little data to transmit, then a full performance mode re-configuration into the increased performance mode may not be warranted due to the above mentioned re-configuration penalty and activation delay.

A similar situation occurs in case a second wireless device 203, already located in the cell 205 of the RBS 201, is powered up and requests service at a performance level above that which is presently configured in the RBS 201, but which only has very little data to transmit before going back to sleep.

Thus, in order to decide whether to trigger a performance mode re-configuration of the RBS 201 into an increased performance mode, or whether to defer re-configuration to a later time instant, or not trigger re-configuration at all, methods for deciding on whether to trigger or not to trigger RBS performance mode re-configuration are needed.

Figure 3:
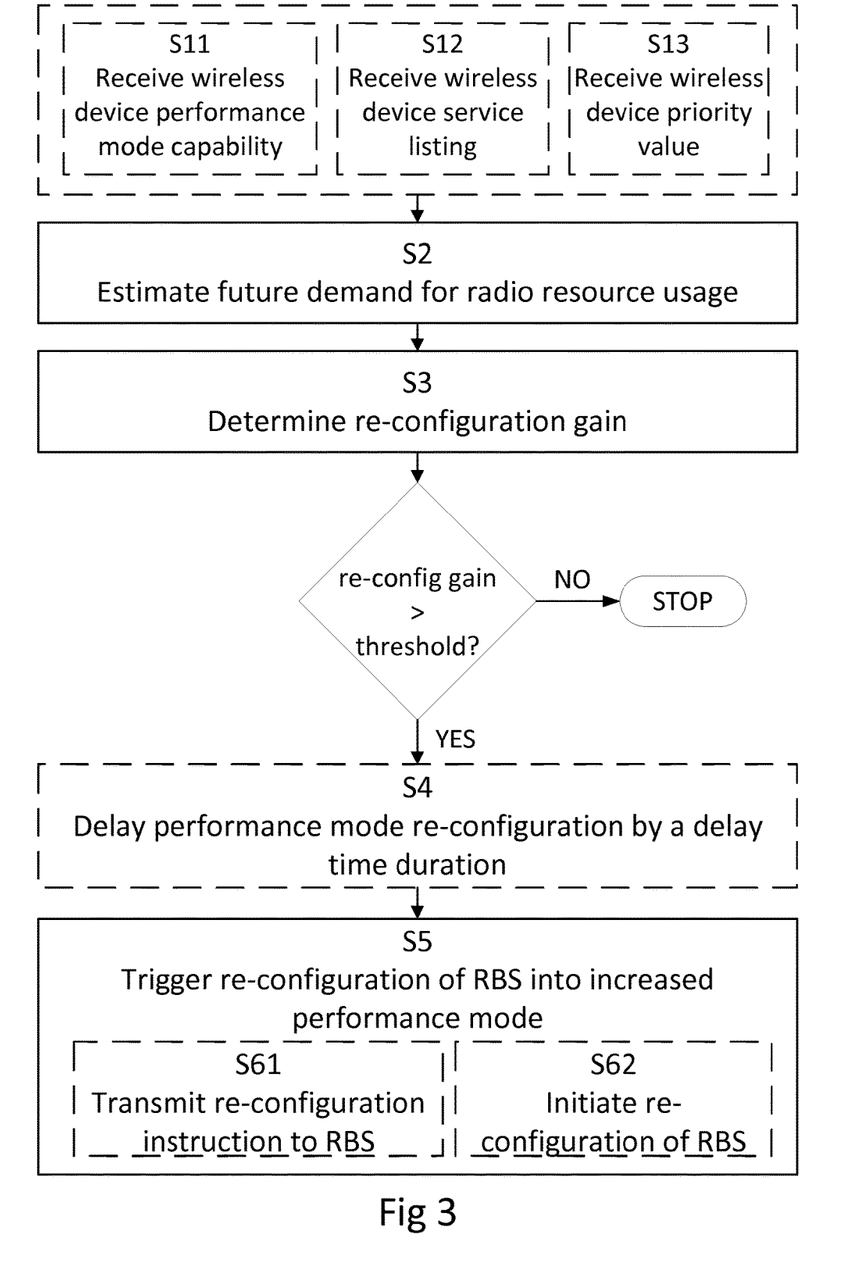
FIG. 3 is a flowchart illustrating embodiments of method steps.

FIG. 3 shows a flowchart illustrating embodiments of method steps directed towards solving the above mentioned issues. In particular, FIG. 3 shows a method in a network node for triggering a re-configuration of an RBS 201 supporting a configured performance mode and an increased performance mode. The method comprises the step of estimating S2 a future demand for resource usage in the RBS 201 by at least one wireless device 202, 203.

The step of estimating S2 a future demand is, according to aspects, to be construed as estimating a near future demand, i.e., the estimating is of a resource usage demand arising in the near future, meaning within minutes, seconds or milliseconds, as opposed to a resource usage demand arising in a more distant future, such as in months, or years, into the future.

Furthermore, the term resource usage is to be construed in a general sense. Thus, according to one aspect, resource usage refers to traditional radio resource usage, such as the use of, e.g., bandwidth, power, code, time, or frequency resources. However, resource usage, according to other aspects, also refers to use of other types of resources such as base-band processing cores, radio frequency, RF chain hardware, power amplifiers, and number of active antenna elements.

For instance, if processing for one wireless device is transferred from one central processing unit core to another in a base-band centralized radio access network, C-RAN, type of node, then that will come at a minor performance degradation, perhaps in form of a re-configuration delay.

The method further comprises determining S3 a re-configuration gain as a difference between a performance metric of the RBS for meeting the estimated future demand for resource usage in the increased performance mode and in the configured mode.

The concept of re-configuration gain is exemplified in FIG. 4 which shows a graph of cell performance 420 and buffer fill levels 421-424 as function of time.

In case a wireless device has a buffer fill level at 100%, corresponding to the uppermost buffer fill level curve 421, the projected buffer depletion time occurs sooner in case of re-configuration than if no re-configuration is triggered, shown by the uppermost dashed-dotted curve 422. Thus, in this case there is a positive re-configuration gain.

However, in case the buffer fill level of the wireless device is only at 50%, corresponding to the bottommost buffer fill level curve 423, then the projected buffer depletion time coincides for the case a re-configuration is triggered compared to when no re-configuration is triggered, shown by the bottommost dashed-dotted curve 424. Consequently, there is no re-configuration gain in this case. An even lower buffer fill level than 50% could here result in a negative re-configuration gain, i.e., a re-configuration loss.

In the evaluation of whether a wireless device can benefit from an RBS performance level re-configuration, knowledge about the future requirements of the wireless device, i.e., an estimated future demand for resource usage by the wireless device, and what benefits the wireless device obtains from utilizing an increased performance level is according to aspects needed.

In the evaluation of the benefits of activating a particular RBS activity level the achievable performance benefit depends on many parameters. However, almost always when switching to a higher activity state the total benefit increases the longer the wireless device will make use of the radio channel. In FIG. 4 this is exemplified by the estimated data that the wireless device will transmit in relation to the activation delay and the expected data rate in the configured performance mode and in the increased performance mode.

In the example of FIG. 4 we see that for some buffer status estimates the wireless device will lose from switching performance level in the RBS, but for larger buffer statuses the wireless device will gain from the switch. This re-configuration gain can thus be weighed against the system cost, in terms of, e.g., power consumption, of activating the alternative access technology.

Consequently, according to some aspects, the step of estimating S2 the future demand is based on a current status of an uplink and/or a downlink data buffer of the at least one wireless device 202, 203. The resource usage then comprises a throughput in terms of transmitted bits or data packets during a pre-determined time window.

The cost of switching to a higher performance level can be of many kinds, as will now be made clear.

According to some aspects, the step of estimating S2 the future demand is based on a pre-determined traffic pattern and a transmission delay requirement of the at least one wireless device 202, 203. In this case the resource usage comprises an expected number of transmissions, by the at least one wireless device 202, 203, of delay sensitive information.

According to some further aspects, the step of estimating S2 the future demand is based on a pre-determined traffic pattern and a transmission error rate requirement of the at least one wireless device 202, 203. The resource usage then comprises an expected number of transmissions, by the at least one wireless device 202, 203, of transmission error sensitive information.

Consequently, the performance metric, according to aspects, comprises any of
  an estimated depletion time of at least one data buffer of the at least one wireless device 202, 203,
  an estimated average or maximum fill level of at least one data buffer of the at least one wireless device 202, 203,
  an estimated number of transmissions via the RBS 201 failing to meet the transmission delay requirement of the at least one wireless device 202, 203,
  an estimated rate of erroneous transmissions relative to the transmission error rate requirement of the at least one wireless device 202, 203, and
  an estimated re-transmission rate of erroneous data packets.

One important cost that is, according to some aspects, considered is the energy consumption of the RBS when activating and/or operating in the increased performance mode compared to the presently configured performance mode.

Thus, according to aspects, the re-configuration gain is further determined based on a power consumption of the RBS operating in the increased performance mode and on a power consumption of the RBS operating in the configured performance mode.

Other relevant costs that are, according to some aspects, considered, are that the increased performance mode often causes inter-cell interference and increased core network load. This cost is for the complete duration of the time that the higher performance level needs to be active; hence a higher performance level should only be activated when the reconfiguration gain is sufficiently large, i.e., above some pre-determined threshold.

Thus, according to aspects, the re-configuration gain is further determined based on a neighboring cell interference level generated by the RBS operating in the increased performance mode and on a neighboring cell interference level generated by the RBS operating in the configured performance mode.

The method further comprises the step of triggering S5 a performance mode re-configuration of the RBS 201 into the increased performance mode based on if the re-configuration gain exceeds a pre-determined threshold.

According to some aspects, the network node is a central network control entity 204 of a radio network 200 comprising the RBS 201 and the at least one wireless device 202, 203. The step of triggering S5 then comprises transmitting S61 a re-configuration instruction message to the RBS 201.

According to some other aspects, the network node is comprised in the RBS 201. The step of triggering S5 then comprises initiating S62 a re-configuration of the RBS 201 into the increased performance mode.

Thus, the methods disclosed herein are not constrained to be implemented in a particular network entity, but can be implemented in several optional locations in a cellular communication network, centrally in a network control entity or more locally in the RBS.

Furthermore, since wireless devices in the cellular communication network do not need to actively support the disclosed method, the present teaching can be applied in a cellular communication network comprising legacy wireless devices, i.e., comprising wireless devices that have not been updated or otherwise configured to support the present technique.

The present teaching is, according to some aspects, suitable for implementation in a fifth generation, 5G, context, where cloud and centralized baseband processing is expected to be common. An RBS is then potentially distributed over an antenna site, a base-band processing-hotel, or a data center.

As noted above, when an RBS or cell goes into dormant mode it becomes invisible for the wireless devices in the communication network. Hence it is a quite drastic action to take. However, instead of entering dormant mode, an active RBS can take several, less drastic, actions in order to reduce energy consumption and/or inter-cell interference.

Examples of actions or procedures for changing the performance mode of an RBS are described below:
  Varying antenna port merging or re-mapping, and power amplifier, PA, muting. By adding the physical signals that are directed towards the antennas and transmitting the sum-signal from a single antenna using a single PA it is possible to turn off all PAs but one in a cell.
  Multiple-Input multiple-output, MIMO, adaptation. That is, replacing a 2 or 4 transmit, TX, antenna cell with a single TX antenna cell. Instead of merging antenna ports and de-activating PAs that are not needed, an alternative is to close down the old MIMO capable cell and start up a new non-MIMO capable cell. The advantage is that the idle mode performance is slightly better and that only one reference signal port needs to be transmitted instead of two.

Sector-to-omni re-configuration. A base station that has several sector cells may de-activate all of them and replace them with a single omnidirectional cell. For a MIMO capable 3-sector base station it is then possible to reduce the number of active PAs from 6 down to 1. Sector to omni reconfiguration is usually considered as a slow energy saving method that operates on a time scale of approximately 12 hours. Typically a site is configured for omni-coverage during night time and sector coverage during day time. However, there are no fundamental reasons why sector-omni-reconfiguration cannot be performed much faster, e.g. on a sub-second time scale. Antenna merging is considered to be a much faster energy saving method applicable on e.g. a timescale of seconds.

Changing multicast broadcast single frequency network, MBSFN, configuration. In long term evolution, LTE, up to 6 out of 10 sub-frames can be defined as MBSFN sub-frames. Since the MBSFN sub-frames do not contain as many cell specific reference symbols as normal sub-frames do, this method reduces the amount of mandatory idle mode signals that a base station needs to transmit.

Adapting the bandwidth used for communication in a cell. For instance, it is possible to replace an LTE active wide-band cell with a narrow band cell. By reducing the bandwidth a radio base station, RBS, needs to transmit less reference signal power.

Carrier aggregation. By activating and de-activating carrier components varying performance levels are obtained.

Hardware utilization. By using fewer processing modules, e.g., antenna elements or central processing unit, CPU, cores, for a given task, less power is needed in such a reduced performance mode. This is of particular interest in centralized radio access networks, CRAN, scenarios where base-band processing for several cells is shared in a large resource pool.

Thus, according to some aspects, the step of initiating S62 further comprises initiating a re-configuration of any one of
a multicast-broadcast single frequency network, MBSFN, configuration in the RBS 201,
an antenna port re-mapping in the RBS 201,
a component carrier activation in the RBS 201,
a power-amplifier, PA, muting in the RBS 201,
a bandwidth adaptation in the RBS 201,
a multiple-input multiple-output, MIMO, adaptation in the RBS 201,
omni-directional antenna to sector antenna in the RBS 201.

As illustrated in FIGS. 1 and 4, there is often a re-configuration penalty and an activation delay associated with switching between performance modes. Some possible reasons for this re-configuration penalty are given below:

Changing multicast broadcast single frequency network, MBSFN, configuration. Removing MBSFN sub-frames in LTE and turning them into normal sub-frames requires system information to be changed. This takes time and during that time the user throughput is limited. When the MBSFN sub-frames are used again neighboring cells may experience a sudden change in inter-cell interference level. This interference degrades cell throughput and link adaptation accuracy, and is therefore likely to cause re-transmissions in the network.

Bandwidth adaptation. Changing the bandwidth of a cell is in many cellular networks, such as networks based on LTE, not practically possible. Instead a new cell needs to be created and the active wireless devices, or user equipments, need to perform a handover. Temporarily the user throughput is then limited, the interference is higher than necessary, and there is an increased risk of radio link failures. Moreover, the inter-cell interference changes suddenly and this may cause negative effects in neighboring cells.

Varying antenna port merging and power amplifier, PA, muting. When de-muting an antenna port the channel estimates made by wireless devices in, e.g., an LTE network, are disturbed. This affects demodulation performance of the wireless devices. Also, rank estimation and pre-coder selection in LTE networks are disturbed, which causes degraded quality in channel quality feedback reports.

Sector-to-omni re-configuration. When re-configuring from omni-to-sector coverage, it is often necessary to perform a handover which drives signaling overhead and increases the risk of radio link failure. In case the omni-cell and the sector cells are active simultaneously during the transition the interference level is increased which temporarily degrades the user throughput. Also if inter-cell-interference is suddenly increased then this may cause troubles in neighboring cells with link adaptation accuracy and reduced throughput.

Carrier aggregation. In order for a wireless device to be able to use an additional carrier it needs to be active a short while in advance. For example, the wireless device needs to be able to create a stable channel estimation of the new carrier in order to demodulate control channels. Some tenth of milliseconds is typically required before the new carrier can be fully utilized. Also, when activating a new carrier inter-cell interference suddenly changes, which generally causes negative effects in the system.

According to some aspects, a wireless device sends information to the RBS about the capabilities of the wireless device. This can be signaled, for example, as a wireless device category in LTE. Some wireless device categories supports, for example, carrier aggregation or demodulation reference signal, DMRS, based transmission modes, TMs, such as TM9 and TM10, closed-loop transmission modes such as TM4 or TM6, or the open-loop transmission modes TM2 or TM3, while some wireless devices only support single steam reception using common reference signals, i.e., TM1.

It makes more sense to increase the activity level or performance mode in the RBS in order to support high data rates for a TM10 capable wireless device than for a TM1 only capable wireless device. Also the number of wireless device antennas, e.g., 2 or 4, and the type of receiver processing, e.g., interference rejection combining, the wireless device is capable of performing is of interest in the selection of RBS performance mode.

Consequently, according to some aspects, the method further comprises the step of receiving S11 a performance mode capability parameter of the at least one wireless device 202, 203. The step of triggering S5 then further comprises triggering based on if the performance mode capability parameter indicates that the at least one wireless device 202, 203 is capable of the increased performance mode.

Further, the wireless device according to aspects communicates information related about the services that it is running and the requirements for these services. This messaging also enables the serving cell to know the priority of the wireless device, for example, depending on subscription and used services.

In an example based on LTE, one such message is buffer status report, BSR, for a service or a set of services or bearers. These services, i.e., bearers, have a corresponding quality of service, QoS, setting that is possible to translate into a service requirement, for example, expressed as a required bitrate, latency, or reliability for the service.

Thus, according to some aspects, the method further comprises the step of receiving S12 a service listing of the at least one wireless device 202, 203. The step of triggering S5 then comprises triggering based on if the service listing comprises a service which benefits from the increased performance mode.

According to some further aspects, the method further comprises the step of receiving S13 a priority value for the at least one wireless device 202, 203. The step of triggering S5 then comprises triggering based on if the at least one priority value exceeds a pre-determined priority threshold.

Typically there will be one high-rate wireless device that triggers the RBS to increase its activity level or performance mode. However there may be a large number of other wireless devices present in the system. For example, there can be many active low-rate wireless devices in the cell that may be negatively impacted by an activity increase on the base station side that they don't benefit from need.

To counteract such negative impacts the activity change may be performed slower, i.e. the activation delay is voluntarily increased. The required activation delay is according to aspects determined by an expected aggregated degradation of all other wireless devices in the cell. A large number of low-rate wireless devices would then result in a longer activation delay compared to a situation with a small number of low rate wireless devices. This procedure potentially results in that the activation change never happens, i.e., re-configuration is deferred, when a large number of active low rate wireless devices are in the cell since in that case there is no resulting reconfiguration gain. In case the high rate wireless device can be expected to be done with the packet transmission shortly after the time when the higher network activity level is available there might be no point of performing the activation change.

Consequently, according to aspects, the method further comprises the step of delaying S4, by a delay time duration, the performance mode re-configuration of the RBS 201. Said delay time duration is determined based on the number of wireless devices being served by the RBS, which served wireless devices are negatively impacted by a performance mode re-configuration into the increased performance mode.

Furthermore, in case several high rate wireless devices have become active at substantially the same time, then the sum of the benefits of the high rate wireless devices is according to aspects weighed against the sum of the drawbacks for the low rate wireless devices in the cell. In this case the selection of activation delay is preferably more aggressive, i.e. resulting in a shorter time to activate the higher activity level in the base station. Hence also in general an activity change can be triggered when there is a set of wireless devices that will in total benefit by the activity change.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, read only memory, ROM, random access memory, RAM, compact discs, CDs, digital versatile discs, DVD, etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Thus, there is further disclosed herein a computer program comprising computer program code which, when executed in a network node, causes the network node to execute the methods disclosed herein.

Figure 5:
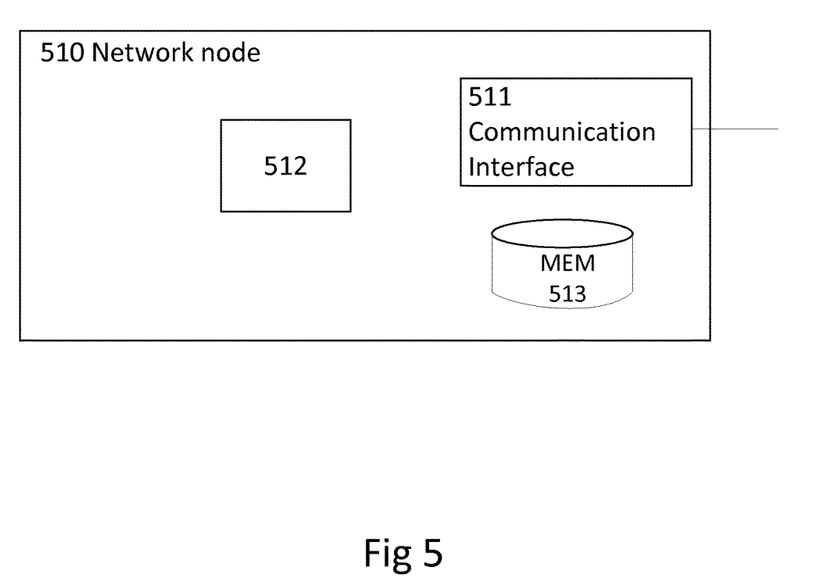
FIGS. 5-6 are block diagram illustrating embodiments of a network node.

Turning now to FIG. 5, which shows a block diagram illustrating embodiments of a network node 510.

The network node 510 is adapted to trigger a re-configuration of a radio base station, RBS, 201 supporting a configured performance mode and an increased performance mode. The network node comprises a communication interface 511 configured for communicating with further network nodes in a radio network 200 comprising the RBS and at least one wireless device 202, 203.

The network node also comprises a processor unit 512, and a memory unit 513. The processor unit 512 is adapted to estimate a future demand for resource usage in the RBS 201 by the at least one wireless device 202, 203.

The processor unit 512 is further adapted to determine a re-configuration gain as a difference between a performance metric of the RBS for meeting the estimated future demand in the increased performance mode and in the configured mode.

Furthermore, the processor unit 512 is adapted to trigger a performance mode re-configuration of the RBS 201 into the increased performance mode based on if the re-configuration gain exceeds a pre-determined threshold.

According to some aspects, the network node 510 is a central network control entity 204 of a radio network 200 comprising the RBS 201 and the at least one wireless device 202, 203. The processor unit 512 is then arranged to generate a re-configuration instruction message and the communication interface 511 is adapted to transmit the re-configuration instruction message to the RBS 201.

According to some other aspects, the network node 510 is comprised in the RBS 201. The processor unit 512 is then arranged to initiate a re-configuration of the RBS 201 into the increased performance mode following a triggering of performance mode re-configuration of the RBS.

According to aspects, in order to support a configured performance mode and an increased performance mode, the network node 510 is further arranged to support any of:

two or more different multicast-broadcast single frequency network, MBSFN, configurations, the configured performance mode corresponding to one MBSFN configuration, the increased performance mode configuration corresponding to another MBSFN configuration, antenna port merging, the configured performance mode corresponding to a mode with a number of merged antenna ports, the increased performance mode corresponding to a mode with a smaller number of merged antenna ports, power-amplifier, PA, muting, the configured performance mode corresponding to a mode with a number of muted PAs, the increased performance mode corresponding to a mode with a smaller number of muted PAs, bandwidth adaptation, the configured performance mode corresponding to a mode with a first bandwidth, the increased performance mode corresponding to a mode with a second bandwidth larger than the first bandwidth, multiple-input multiple-output, MIMO, adaptation, the configured performance mode corresponding to a mode with a first number of MIMO layers, the increased performance mode corresponding to a mode with a second number of MIMO layers larger than the first number, both omni-directional antenna and sector antennae to cover a cell of the RBS, the configured performance mode corresponding to a mode with the omni-directional antenna, the increased performance mode corresponding to a mode with the sector antennas.

Figure 6:
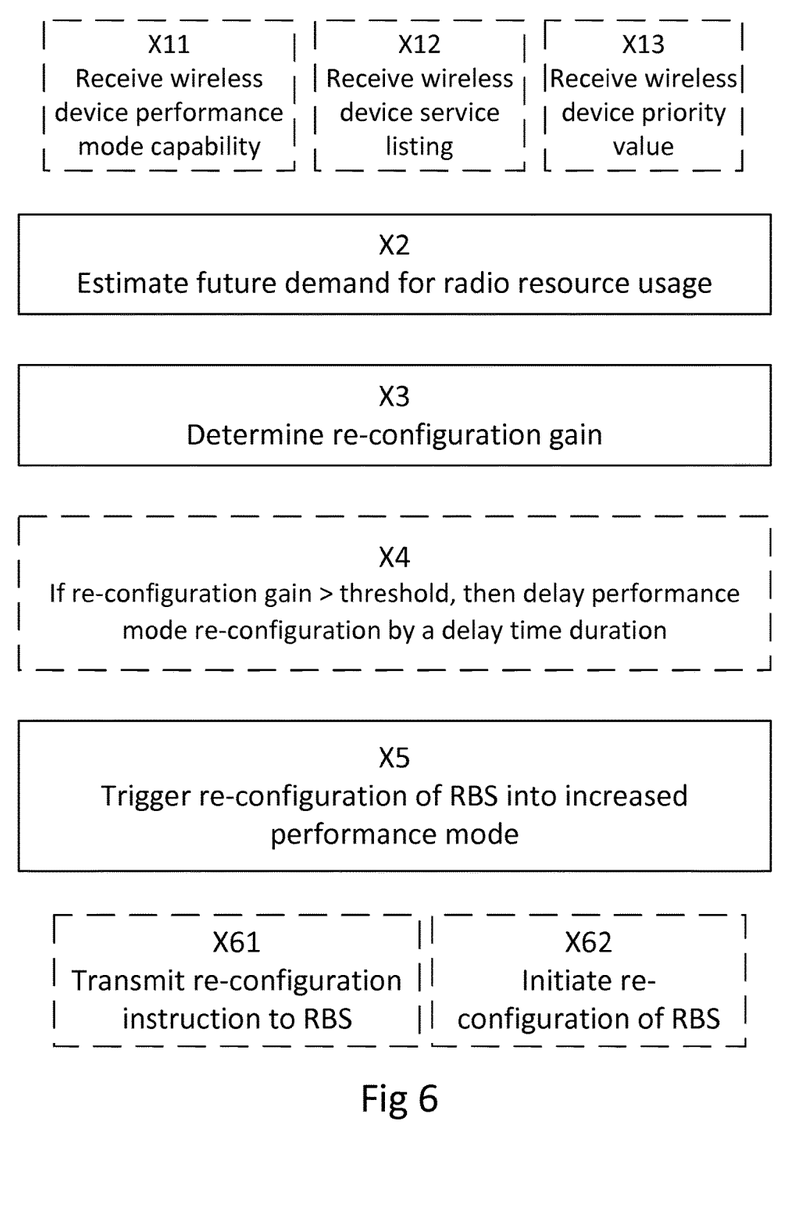

FIG. 6 shows a network node for triggering a re-configuration of a radio base station, RBS, 201 supporting a configured performance mode and an increased performance mode. The network node comprises:

a first optional module, X11, configured to receive a performance mode capability parameter of at least one wireless device 202, 203, a second optional module, X12, configured to of receive a service listing of the at least one wireless device 202, 203, a third optional module, X13, configured to receive a priority value for the at least one wireless device 202, 203, a fourth module, X2, configured to estimate a future demand for resource usage in the RBS 201 by the at least one wireless device 202, 203, a fifth module, X3, configured to determine a re-configuration gain as a difference between a performance metric of the RBS for meeting the estimated future demand for resource usage in the increased performance mode and in the configured mode, a sixth optional module, X4, configured to delay, by a delay time duration, the performance mode re-configuration of the RBS 201, said delay time duration being determined based on the number of wireless devices being served by the RBS, which served wireless devices are negatively impacted by a performance mode re-configuration into the increased performance mode, a seventh module, X5, configured to trigger a performance mode re-configuration of the RBS 201 into the increased performance mode based on if the re-configuration gain exceeds a pre-determined threshold, an eight optional module, X61, configured to transmit a re-configuration instruction message to the RBS 201, and a ninth optional module, X62, configured to initiate a re-configuration of the RBS 201 into the increased performance mode.

The invention claimed is:

1. A method in a network node for triggering a re-configuration of a radio base station (RBS) supporting a configured performance mode and an increased performance mode, the method comprising:

estimating a future demand for resource usage in the RBS by a wireless device (WD) having a transmit buffer, wherein the estimating comprises determining a buffer fill level of the WD's transmit buffer;

estimating a first performance metric using the determined buffer fill level and information corresponding to the configured performance mode;

estimating a second performance metric using the determined buffer fill level and information corresponding to the increased performance mode;

determining a re-configuration gain of the RBS based at least in part on the determined buffer fill level of the WD's transmit buffer, wherein determining the re-configuration gain of the RBS based at least in part on the determined buffer fill level comprises determining a gain value by computing a difference between the estimated first performance metric and the estimated second performance metric, wherein both the estimated first and second performance metrics are a function of the determined buffer fill level;

determining whether the determined re-configuration gain exceeds a pre-determined threshold; and triggering a performance mode re-configuration of the RBS into the increased performance mode based on whether the re-configuration gain exceeds the pre-determined threshold.

2. The method according to claim 1, wherein the network node is a central network control entity of a radio network comprising the RBS, and wherein the triggering comprises transmitting a re-configuration instruction message to the RBS.

3. The method according to claim 1, wherein the network node is comprised in the RBS, and the triggering comprises initiating the re-configuration of the RBS into the increased performance mode.

4. The method according to claim 1, wherein said resource usage comprises a throughput in terms of transmitted bits or data packets during a pre-determined time window.

5. The method according to claim 1, wherein the re-configuration gain is further determined based on a power consumption of the RBS operating in the increased performance mode and on a power consumption of the RBS operating in the configured performance mode.

6. The method according to claim 1, wherein the re-configuration gain is further determined based on a neighboring cell interference level generated by the RBS operating in the increased performance mode and on a neighboring cell interference level generated by the RBS operating in the configured performance mode.

7. The method according to claim 1, further comprising receiving a performance mode capability parameter of the WD, and wherein the triggering further comprises triggering based on if the performance mode capability parameter indicates that the WD is capable of the increased performance mode.

8. The method according to claim 1, further comprising receiving a service listing of the WD, and wherein the triggering further comprises triggering based on if the service listing comprises a service which benefits from the increased performance mode.

9. The method according to claim 1, further comprising receiving a priority value for the WD, and wherein the triggering comprises triggering based on if the priority value exceeds a pre-determined priority threshold.

10. The method according to claim 1, further comprising delaying, by a delay time duration, the performance mode re-configuration of the RBS, said delay time duration being determined based on a number of wireless devices being served by the RBS.

11. A computer program product comprising a non-transitory computer readable medium comprising a computer program comprising computer program code which, when executed in a network node, causes the network node to execute the method according to claim 1.

12. The method of claim 1, wherein determining the re-configuration gain based at least in part on the determined buffer fill level of the WD's transmit buffer comprises:
estimating a first buffer depletion time based on the determined buffer fill level and based on the configured performance mode;
estimating a second buffer depletion time based on the determined buffer fill level and based on the increased performance mode; and
determining the re-configuration gain based on the estimated first buffer depletion time and the estimated second buffer depletion time.

13. The method of claim 1, further comprising
estimating an activation delay associated with the switching from the configured performance mode to the increased performance mode, wherein
determining the re-configuration gain based at least in part on the determined buffer fill level of the WD's transmit buffer comprises determining the re-configuration gain based at least on: i) the determined buffer fill level and ii) the estimated activation delay associated with the switching from the configured performance mode to the increased performance mode.

14. The method of claim 1, wherein
the method further comprises determining a re-configuration delay time duration, and
the triggering the performance mode re-configuration comprises triggering the performance mode re-configuration to occur after expiration of the re-configuration delay time duration.

15. The method of claim 14, wherein determining the re-configuration delay time duration comprises:
determining a number of wireless devices being served by the RBS that would be negatively impacted by the performance mode re-configuration; and
setting the re-configuration delay time duration based on the determined number of wireless devices being served by the RBS that would be negatively impacted by the performance mode re-configuration.

16. A network node adapted to trigger a re-configuration of a radio base station (RBS) supporting a configured performance mode and an increased performance mode, the network node comprising:
a communication interface configured for communicating with further network nodes in a radio network comprising the RBS and a wireless device (WD) having a transmit buffer,
a processor, and
a memory, wherein
the processor is adapted to:
estimate a future demand for resource usage in the RBS by the WD, wherein the estimating comprises determining a buffer fill level of the WD's transmit buffer;
estimate a first performance metric using the determined buffer fill level and information corresponding to the configured performance mode;
estimate a second performance metric using the determined buffer fill level and information corresponding to the increased performance mode;
determine a re-configuration gain of the RBS based at least in part on the determined buffer fill level of the WD's transmit buffer by performing a process that includes determining a gain value by computing a difference between the estimated first performance metric and the estimated second performance metric, wherein both the estimated first and second performance metrics are a function of the determined buffer fill level; and
trigger a performance mode re-configuration of the RBS into the increased performance mode based on whether the determined re-configuration gain exceeds a pre-determined threshold.

17. The network node according to claim 16, wherein the network node is a central network control entity of the radio network comprising the RBS, and wherein the processor being arranged to generate a re-configuration instruction message, the communication interface being further adapted to transmit the re-configuration instruction message to the RBS.

18. The network node according to claim 16, wherein the network node is comprised in the RBS, and wherein the processor is arranged to initiate the re-configuration of the RBS into the increased performance mode following the triggering of the performance mode re-configuration of the RBS.

* * * * *